United States Patent [15] 3,692,943
Thelemaque [45] Sept. 19, 1972

[54] MULTIPLE MARK DETECTORS FOR END MARKED SWITCHING NETWORKS

[72] Inventor: Louis Emanuel Thelemaque, Longmont, Colo.

[73] Assignee: Bell Telephone Laboratories, Incorporated, Murray Hill, N.J.

[22] Filed: May 21, 1971

[21] Appl. No.: 145,734

[52] U.S. Cl. ..............................179/18 E, 179/18 GF
[51] Int. Cl. ..............................................H04q 3/42
[58] Field of Search .........................179/18 E, 18 EB

[56] References Cited

UNITED STATES PATENTS 3,588,367 6/1971 White....................179/18 GF

*Primary Examiner*—William C. Cooper
*Attorney*—R. J. Guenther and James Warren Falk

[57] ABSTRACT

A switching system utilizing an end marked network has circuitry for detecting the presence of double marks on either side of the network. The network functions in the conventional manner to complete a connection between a line side and a trunk side circuit in response to the application of a single mark on each side. In response to the simultaneous application of two or more marks to either side, the detection circuitry recognizes this as a trouble condition, generates an alarm signal, and prevents the network from attempting to respond to the simultaneously applied marks.

21 Claims, 11 Drawing Figures

Figure 1:
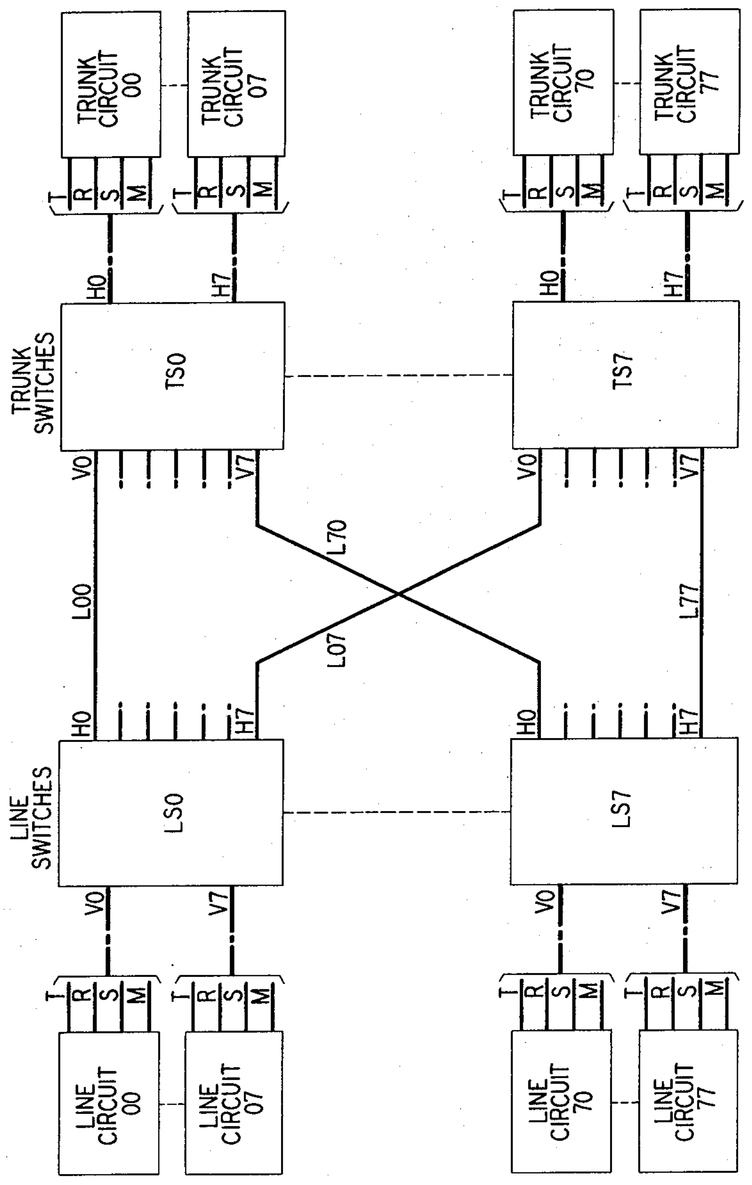

INVENTOR
L. E. THELEMAQUE
BY
Donald M Duft
ATTORNEY

MULTIPLE MARK DETECTORS FOR END MARKED SWITCHING NETWORKS

BACKGROUND OF THE INVENTION

This invention relates to a switching system, and in particular to a switching system having an end marked network. The invention further relates to a switching system having facilities for detecting the application of more than one mark simultaneously to either side of an end marked network.

Switching systems equipped with end marked networks are known. In such systems, connections are established between the line side and trunk side circuits by applying marking potentials to the network. The network responds to the marking potentials and establishes a connection between the two circuits whose terminals are marked.

End marked networks are said to be self-controlled in that they operate on their own to select and establish connections between traffic circuits associated with marked terminals. The use of such networks lessens the complexity of the system control circuitry. The reason for this is that in order to establish a connection between a specified line side and a specified trunk side circuit, the only requirement of the system control is that it apply a marking potential to the network appearances of the two circuits. The network responds to the marking potentials, determines whether an idle path is available, and if it is, establishes the path it selects. This mode of operation frees the system controller from the task of determining which of a plurality of idle paths is to be used on a given connection.

Although the use of an end marked network simplifies the design of the system controller, systems of this type are vulnerable to trouble conditions and malfunctions which cause two or more marks simultaneously to be applied to either side of the network. Specifically, if due to a trouble condition, two terminals are marked simultaneously on its line side while a single terminal is marked on its trunk side, the network is obviously unable to determine which of the two marked line side circuits is to be connected with the marked trunk side circuit. Under such conditions, the network either establishes unwanted paths in addition to the correct path, destroys existing paths, or alternatively establishes no path at all and causes the system controller to energize a time out alarm after the call connection is not completed within a predetermined time. None of these alternatives is satisfactory. The establishment of erroneous paths or the destruction of existing paths is obviously not an acceptable operational characteristic. The actuation of the time out alarm does little, if anything, to identify the nature of the trouble since this alarm is indicative of many different possible trouble conditions.

BRIEF SUMMARY OF THE INVENTION

1. Objects

It is therefore an object of the invention to provide facilities for detecting the application of two or more marks simultaneously to either side of an end marked network.

It is a further object of the invention to prevent the network from responding to the simultaneous application of double marking potentials.

It is a further object to provide alarm facilities for indicating a double marking condition of the network.

2 Summary Description

A switching system is provided in accordance with the present invention having facilities for detecting the application of double marking potentials simultaneously to either side of an end marked network, for preventing the network from responding to these marking potentials, and for actuating an alarm to indicate the specific nature of the trouble condition. The system includes two translators, one for each side of the network. Each translator has an input individual to each marking conductor connected to an appearance on its side of the network. The translator responds to the reception of a marking potential on any of its inputs and, in response thereto, generates output information identifying the network switch to which the energized marking conductor is connected, as well as the particular switch vertical or horizontal serving the energized conductor. The output of the translator is connected to a pair of encoders. The first of these is termed a binary encoder and it generates a binary representation of the translator output information, namely the switch number, and switch vertical (or horizontal) for the marked terminal. The second of these translators is termed a binary complement encoder and it generates the binary complement of the output of the first encoder.

The outputs of the two encoders are applied to a comparison circuit which determines whether the outputs are complementary in each of their binary orders. The output of the comparison circuitry is connected to the network controller in such a manner that the network is permitted to respond to marking potentials and establish a path only if the outputs of the two decoders are complementary. This complementary condition will prevail whenever a single marking potential is applied to each side of the network. However, when two or more marks are simultaneously applied to a side, its two encoders generate output information that is not complementary. The comparison circuitry detects this noncomplementary relationship, inhibits the network path establishing circuitry, and generates an alarm condition indicative of the double marked system condition.

The encoders are of such a design that in response to input signals indicating multiple marks, the output of each encoder represents an ORing of the outputs it would generate if each mark had been received independently of the other. Under such conditions, the output of the complement encoder for each of its bit orders is no longer the complement of the output of the binary encoder. In other words, in certain of the bit orders, the outputs of the two encoders are the same rather than complementary. This turns on the AND gates for the orders for which the encoder outputs are not complementary. The turn of of one or more AND gates actuates the alarm, inhibits the operation of the network controller and prevents the establishment of any network path.

In addition to its double mark detection capability, the circuitry of my invention also detects malfunctions in the path control relays. These relays are connected to the output of the binary encoder and they are selectively operated by it to close the necessary network crosspoints. A make contact of each of these relays is extended through logic circuitry to the aforementioned AND gates. If a relay remains operated and fails to release after its path establishment operations for a connection had been completed, the contacts of this relay will supply an unwanted binary "1 "to its AND gate when a request for a new network path is subsequently received. Provided that the output of the binary encoder at this time does not specify the operation of the defective relay, the information then applied to the AND gate associated with the defective relay will destroy the complementary relationship between the encoder outputs. This causes the AND gate to turn on and indicate a trouble condition in the same manner as already mentioned.

FEATURES

A feature of this invention is the provision of circuitry for detecting the application of double marking potentials to end marked networks.

A further feature is the provision of circuitry responsive to the detection of the double marking potentials for preventing the network from responding to the potentials, and for generating an alarm indicating the specific nature of the system trouble condition.

These and other objects and features of the invention will become apparent from a reading of the following description of the invention taken in conjunction with the drawing in which:

DRAWING

Figure 2A:
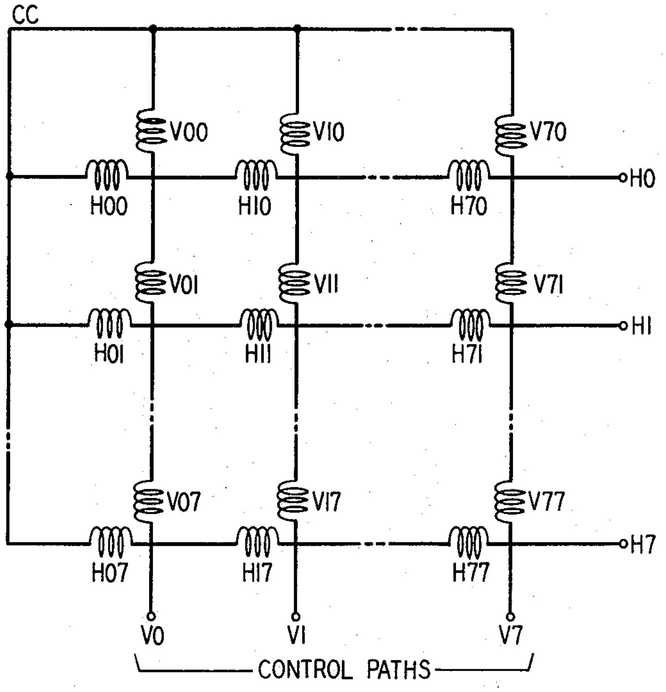
Figure 2B:
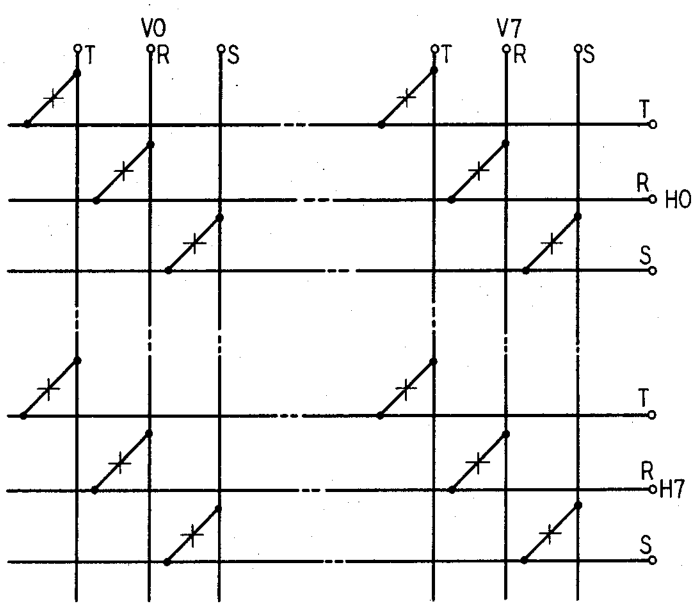

FIG. 1 diagramatically discloses a switching system having a two stage end marked network; and FIGS. 2A and 2B disclose a ferreed matrix switch of the eight by eight type.

Figure 5:
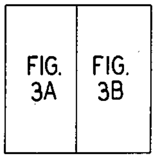
Figure 3A:
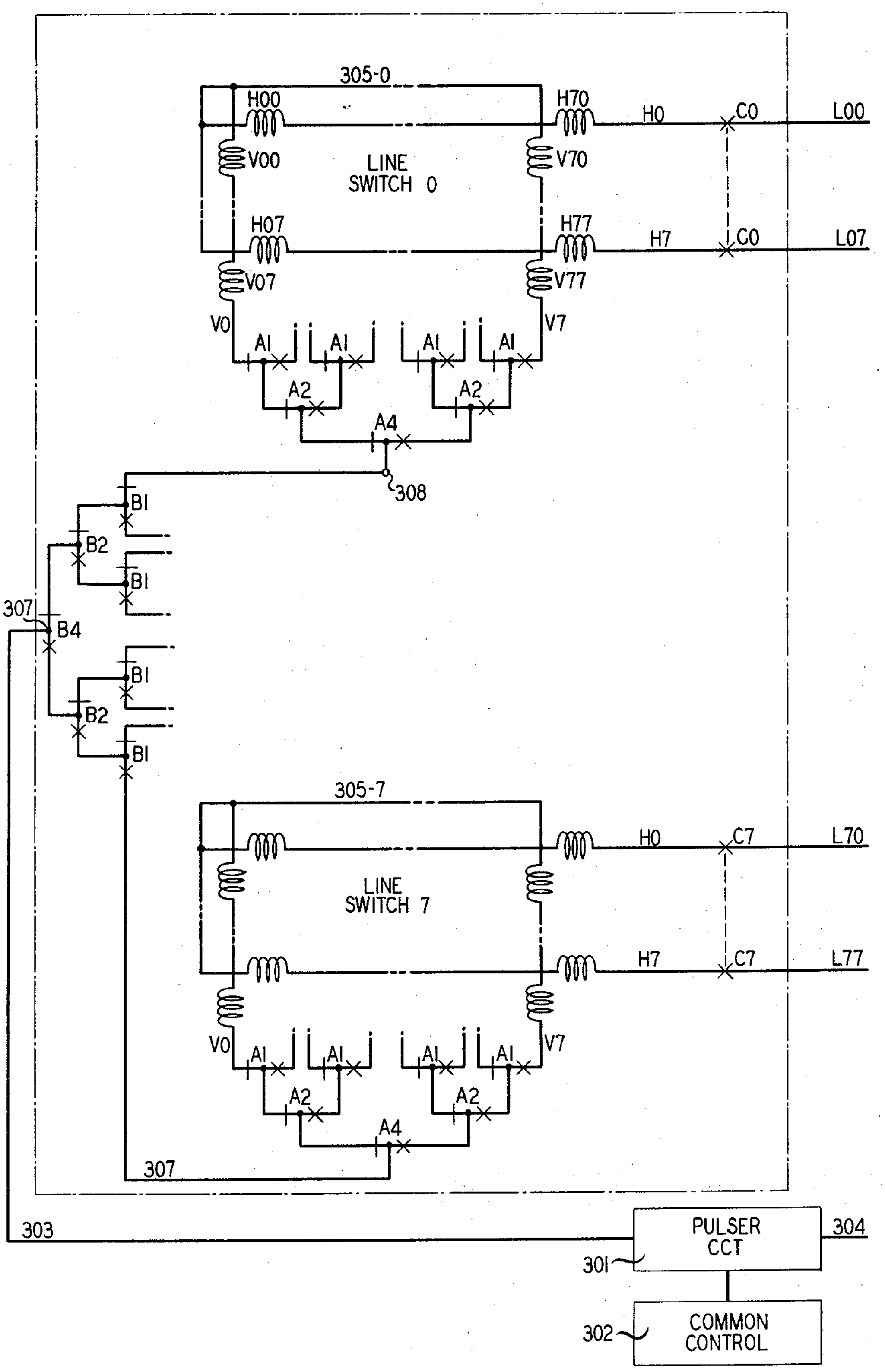
Figure 3B:
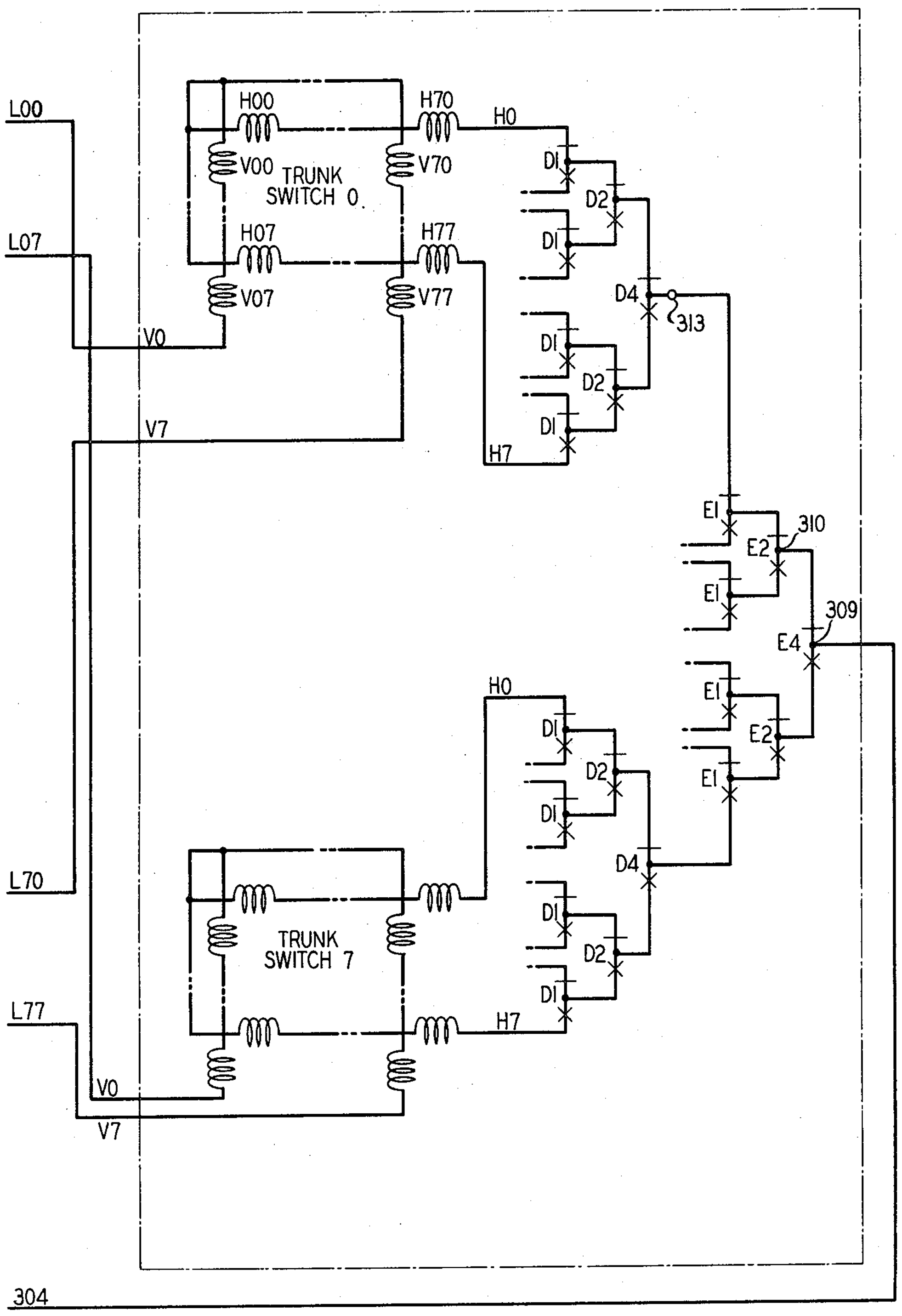

FIGS. 3A and 3B, when arranged as shown on FIG. 5, disclose the control circuitry for ferreed network windings.

Figure 6:
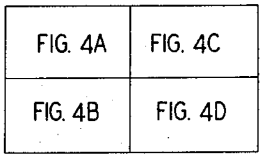

FIG. 4A, 4B, 4C and 4D, when arranged as shown on FIG. 6, illustrate the circuitry provided in accordance with the present invention for detecting the simultaneous application of more than one mark to either side of an end marked network.

DESCRIPTION

The present invention is shown as embodied in a two-stage network of the type shown generally in FIG. 1. This network has eight line side switches designated LS0 through LS7 and eight trunk side switches designated TS0 through TS7. Each switch is of the eight by eight type in that it has eight horizontals and eight verticals. Each line switch serves eight line circuits and each trunk switch serves eight trunk circuits. The line circuits are connected to the switch verticals. The trunk circuits are connected to the switch horizontals. The line circuits and the trunk circuits are designated in octal form. Thus the line circuits for line switch LS0 are designated LC00 through LC07 and the line circuits for line switch LS7 are designated LC70 through LC77. In a similar manner, the trunk circuits are designated octally TC00 through TC77.

Each line side switch has eight links connected to its horizontals with each link extending from the line switch to a vertical of a different one of the trunk switches. Thus, link L00 connects horizontal HO of line switch 0 with vertical VO of trunk switch 0, link L07 connects line switch 0 with trunk switch 7. Each line circuit and each trunk circuit is connected to the network by four conductors designated T, R, S and M. The T, R and S conductors are the conventional tip and ring sleeve conductors and they are extended through the network when it establishes a path between a line side and a trunk side circuit. The M conductors are unique to end marked networks and each such conductor extends only to the network appearance of its traffic circuit. In a manner well known in the art, the network responds to marks on the M conductors to complete a network path between the circuits associated with marked conductors.

FIGS. 2A and 2B disclose further details of the individual switches which comprise the network shown of FIG. 1. FIGS. 2A and 2B together show a coordinate array of ferreed switches arranged to form a matrix switch. FIG. 2A illustrates the manner in which the control windings of the individual ferreed switches are interconnected,; FIG. 2B illustrates the manner in which the crosspoint contacts are arranged to permit any switch vertical to be connected to any horizontal.

Ferreed switches per se are well known in the art. They are described in the T. N. Lowery U.S. Pat. No. 3,037,085 of May 29, 1962 and in the *Bell System Technical Journals* for January 1960 Vol. 39 No. 1 on pages 1 through 30 in an article entitled, "The Ferreed —A New Switching Device" by Messrs. A. Feiner, C. A. Lovell, T. N. Lowery, P. G. Ridinger. Further information concerning ferreed switches is shown in the *Bell System Technical Journal*, January 1964, in an article by A. Feiner entitled "The Ferreed" on pages 1 through 14.

On FIG. 2A each ferreed switch has two control windings, such as the windings VOO and HOO for the switch at the upper left-hand crosspoint. Winding VOO is termed the column control winding; HOO is termed the horizontal control winding. On FIG. 2B the contacts are arranged in a matrix array corresponding to that of the control windings. Thus, control windings VOO and HOO together control the operation and release of the contacts common to the HO, VO crosspoint on FIG. 2B.

The horizontal control windings of a row are connected in series with each other and in turn to a row conductor, such as HO for row 0; the vertical windings of a column are connected in series to a column conductor, such as VO. The top of each column conductor and the left end of each row conductor are connected to a bus designated CC. This configuration is known in the art as a Haywood bus and is described in the U.S. patent to W. S. Haywood, Jr. U.S. Pat. No. 3,110,772 of Nov. 12, 1963. The energization of either one, but not both, of the control windings of a ferreed releases its switch contacts. The energization of both windings simultaneously closes its contacts. A connection can be effected between the conductor of a selected row and column by applying a marking potential to their control conductors For example, on FIG. 2A the energization of row control conductor HO and the vertical conductor VO closes the switch contacts of the upper left crosspoint on FIG. 2B. It also releases the switch contacts on other crosspoints for row 0 and vertical 0. Thus, after a connection between the row 0 and vertical 0 conductors on FIG. 2A is effected all connections to these conductors from other crosspoints all may have been closed are released.

FIGS. 3A and 3B, when arranged with respect to each other as shown on FIG. 5, disclose the circuitry required for controlling the switch crosspoints of a two stage network. Line switches 0 through 7 are shown on FIG. 3A; trunk switches 0 through 7 are shown on FIG. 3B. These figures disclose only the circuitry that closes or releases the switch crosspoints, and therefore only the control windings of the switches are shown.

Pulser 301 on the bottom of FIG. 3B generates the potentials required to energize the control windings. The circuit of FIG. 3A includes contacts of relays A1, A2, A4 and B1, B2 and B4. Similarly, the circuit of FIG. 3B includes contacts of relays D1, D2, D4, E1, E2 and E4. These relays are operated in the manner subsequently described to interconnect the output conductors 303 and 304 of the pulser 301 with the control windings of the crosspoints that are to be closed.

For example, let it be assumed that it is desired to establish a connection between line circuit 0 and trunk circuit 0. Line circuit 0 is served by vertical VO of line switch 0; trunk circuit 0 is served by horizontal HO of trunk switch 0. The only link that interconnects line switch 0 with trunk switch 0 is link L00. This link includes relay contacts CO; on its left end it is connected to horizontal HO of the line switch 0 and on its right end it is connected to vertical VO of trunk switch 0. Thus, the interconnection of line circuit 0 with trunk circuit 0 requires the use of link L00, the closure of make contacts CO, and the closure of crosspoints 00 on both line switch 0 and trunk switch 0. As already mentioned the closure of a selected set of crosspoint contacts requires the energization of both of the ferreed control windings common to the crosspoints. Thus, the connection now being described requires the energization of control windings VOO and HOO on line switch 0 and trunk switch 0.

From an inspection of the circuitry associated with the contacts of the A- and B- relays, it may be seen that output conductor 303 of the pulser will be connected to control conductor VO of line switch 0 when all of the A- and B- relays are released. At that time a path may be traced via conductor 303 to terminal 307, through break contacts B4 and B2 and B1 to terminal 308, and from there through break contacts of relays A4, A2 and A1 to the conductor VO of line switch 0.

From an inspection of the circuitry associated with the E- and D- relays on FIGS. 3B it may be seen that the output conductor 304 of the pulser will be connected to the control conductor HO of trunk switch O when all of the D- and E- relays are released. At that time, conductor 304 is extended to terminal 309 and from there via break contacts E4, E2 and E1 to terminal 313, through break contacts of relays D4, D2 and D1 to the control conductor HO of the switch. At this time, and with relay CO operated, the control windings VOO and HOO of both switches are effectively in series with each other and with the output of the pulser. When the pulser generates an output pulse, current flows through both control windings for crosspoints 00 on each of the two switches. This current, as already described, closes the make contacts of the crosspoints and interconnects their T, R and S conductors. This same current flows through the other control windings for vertical 0 and the horizontal 0 of the same two switches. This current flowing through only single windings of each of these other crosspoints releases their contacts in the event that they were in an operated state. The time at which the pulser 301 sends out the current required to close a set of crosspoints is under the control of common control 302. This is described in detail subsequently.

Figure 4A:
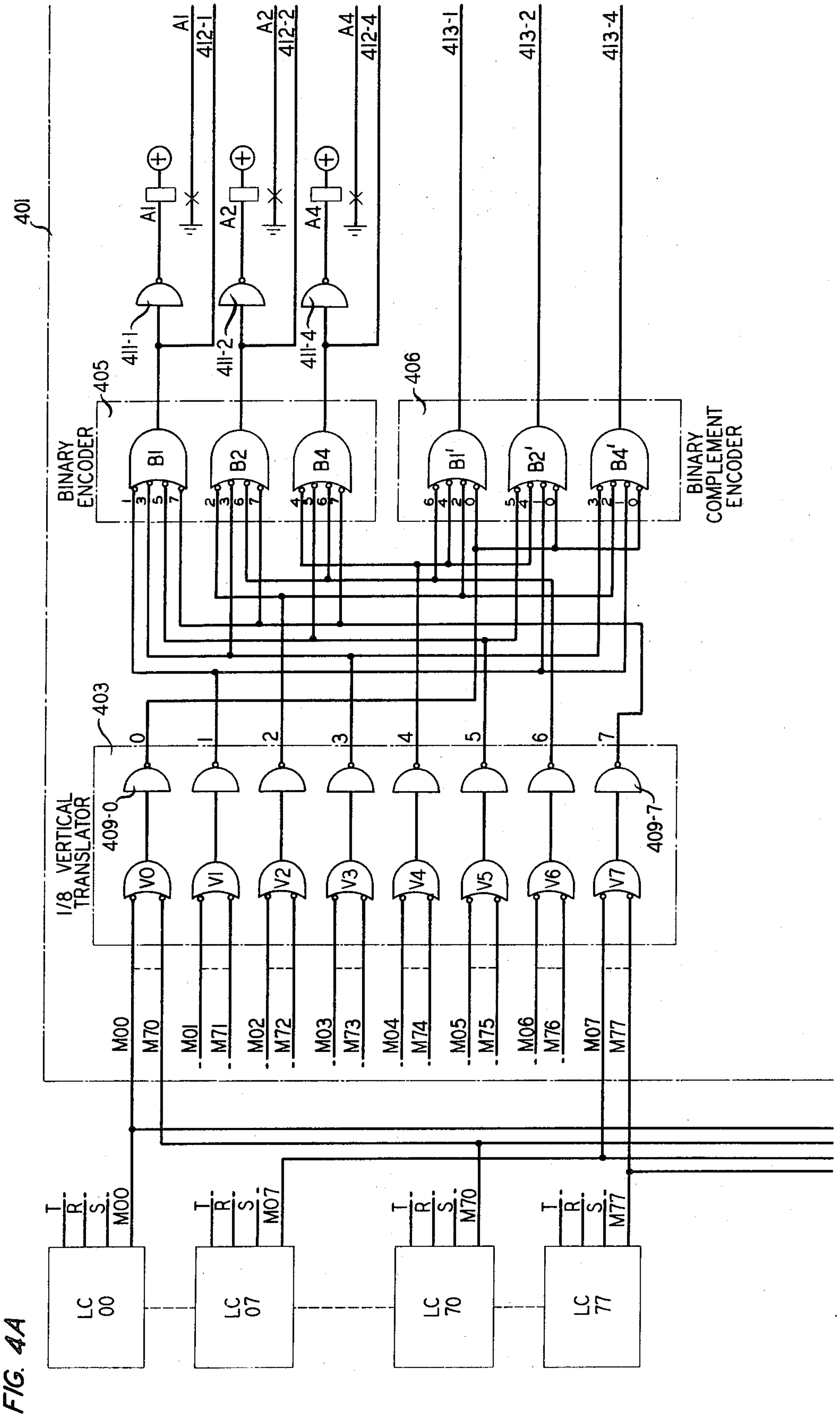
Figure 4B:
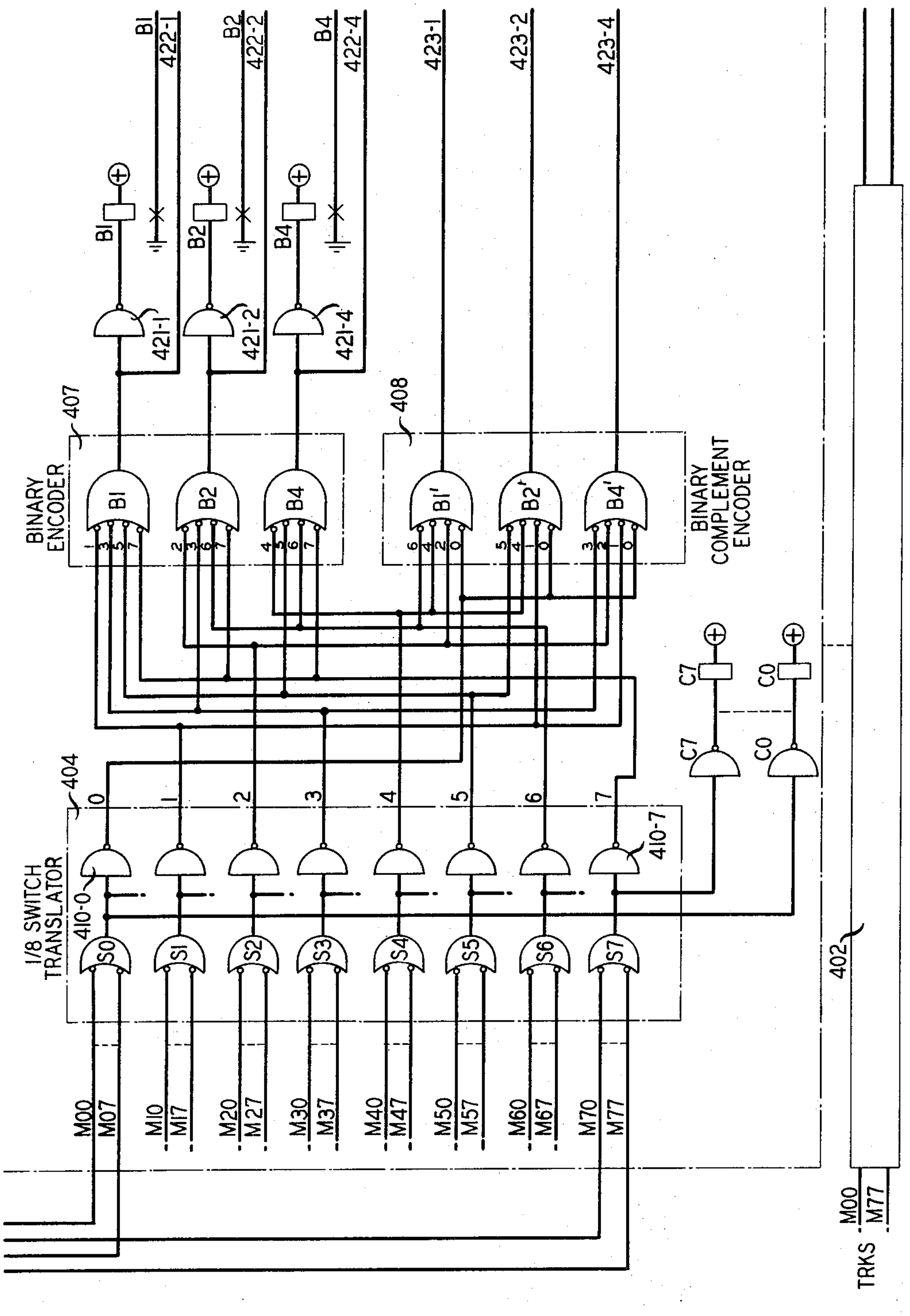
Figure 4C:
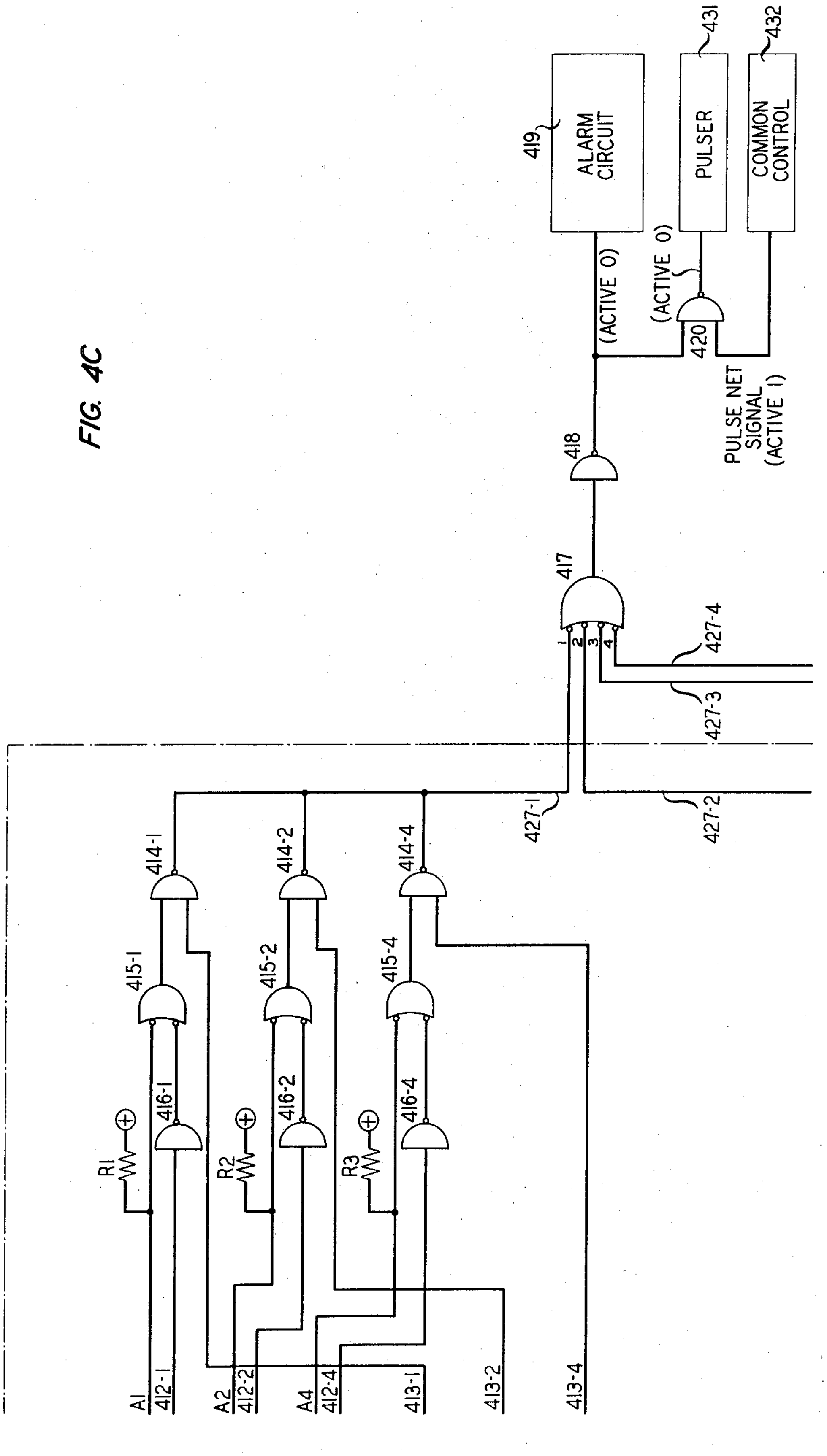
Figure 4D:
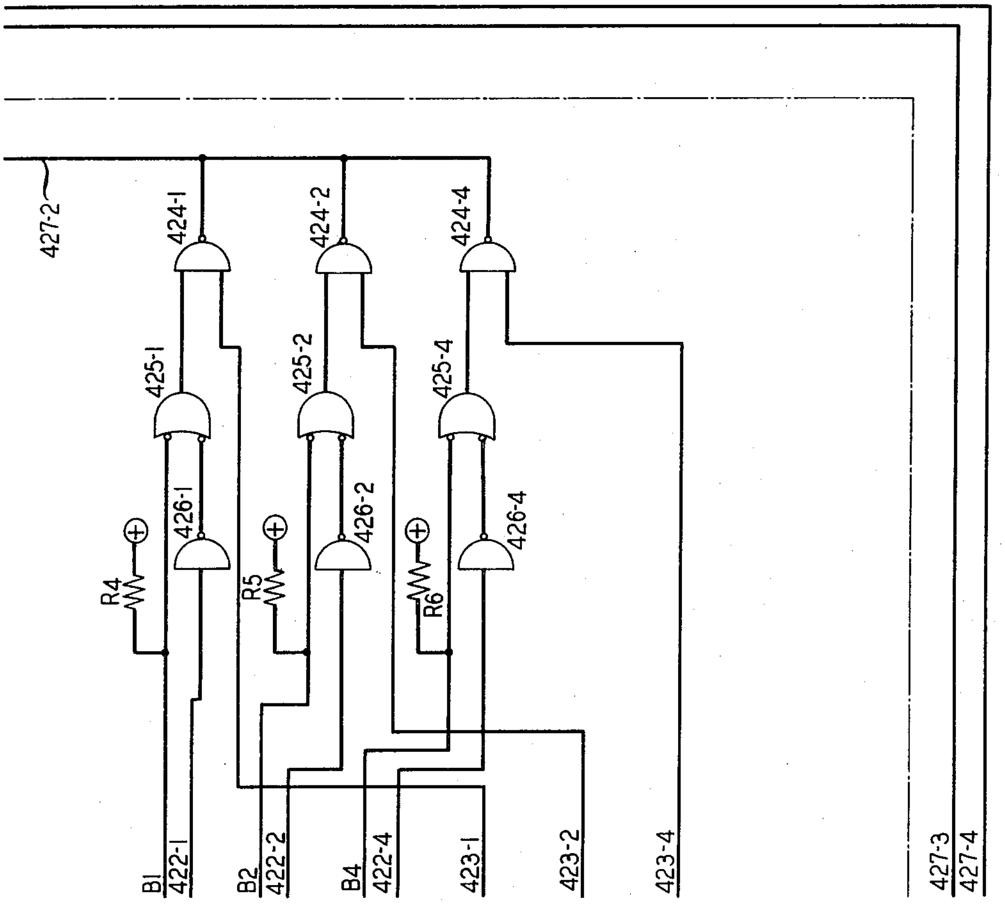

FIGS. 4A through 4C, when arranged with respect to each other as shown on FIG. 6, disclose the circuitry provided in accordance with my invention for detecting the application of more than one mark at a time to either side of the network. The equipment within rectangle 401 is shown in detail and performs this double marked detection function for the line side of the network. The corresponding equipment for the trunk side is shown only diagrammatically by rectangle 402 since it contains circuitry identical to that of rectangle 401.

Line circuits LC00 through 77 are shown on the left side of FIG. 4A. The T, R and S conductors of each line circuit is not connected to the circuitry of FIGS. 4, but instead, extends to the crosspoint contacts of the various switches as shown on FIG. 1. The M conductor of each line circuit extends to an input of a vertical translator 403 (FIG. 4A) and to an input of a switch translator 404 (FIG. 4B). The function of the vertical translator is to provide an output signal indicating the switch vertical serving a line circuit having an energized M lead. Similarly, the function of the switch translator is to provide an output signal identifying the switch that serves the marked line circuit. The outputs of the two translators together uniquely identify the line circuit.

Let it once again be assumed that line circuit 00 is to be connected to trunk circuit 00. The M lead of this line circuit is designated M00 and it extends to gate VO in the vertical translator as well as to gate SO in the switch translator. The various inputs of gate VO are connected to all of the line circuits (00,10,20 . . . 70) that are served by a vertical 0 of one of line switches 0 through 7. The inputs of gate SO are connected to the M leads of all line circuits (00 through 07) served by line switch 0. In an analogous manner, gate V7 of the vertical translator is connected to the M leads of all line circuits served by the seventh vertical of a line switch; gate S7 is connected to the M leads of all line circuits served by line switch 7.

All of the gates shown on FIGS. 4 are of the NAND type. The OR gates, e.g., VO, work in such a manner that any one or more input being low will drive the output high. The AND e.g., 409-0 or 414-1 gates operate in such a manner that all of the inputs driven high will drive the output low.

The output of the vertical and switch translators are designated 0 through 7 and each represents a correspondingly designated switch vertical or switch number. For example, when line circuit 00 marks its M conductor to request a connection, a ground or low potential is applied to conductor MOO by the line circuit. This ground is extended to the upper input of gate VO as well as to the upper input of gate SO. With respect to vertical translator 403, the ground on the upper input conductor of gate VO drives its output high which extends to the input of gate 409-0. The high on the input of this gate drives its output low extending to the output conductor 0 of the translator. The ground potential (a binary 0) on this conductor indicates that a line circuit served by a vertical 0 of a switch is currently marked. In a similar manner, the ground or binary 0 on the input of gate SO generates a high or a binary 1 on the output of the gate which, in turn, generates a low on the output of gate 410-0. This applies a low to output 0 of the switch translator as an indication that the marked circuit is served by a switch 0. A low or binary 0 on the output conductor 0 of both translators indicates that the line circuit now being marked is served by vertical 0 of switch 0, in other words, line circuit 00. A low on output conductor 7 of each translator would indicate that the calling line circuit is connected to the seventh vertical of the seventh switch.

Further with respect to the switch translator 404, the output of each of gates SO through S7 is connected to gates CO through C7 respectively, and in turn to relays CO through C7. One of the C- relays operates each time its associated S gate receives a marking potential at its input. Thus with respect to the connection now being described, a mark on conductor MOO generates a binary 1 at the output of gate SO. This causes the output of gate CO to go to a ground potential to operate relay CO. From an inspection of FIGS. 3 it may be seen that the operation of relay CO is required any time a connection is to be extended between line switch 0 and any of the trunk switches.

The output conductors of the vertical translator 403 are connected to the inputs of the binary encoder 405 as well as to the inputs of binary complement encoder 406. The binary encoder 405 responds to the translator output signals and generates the binary equivalent of the number of the currently marked switch vertical. The binary complement encoder 406 generates the binary complement of the switch vertical. With respect to the call connection now being described, the ground or binary 0 on output 0 of the vertical translator is extended to the B1', B2' and B4' gates of the complement encoder. All three of these gates now turn off and drive their outputs high, i.e., to a binary 1. The outputs of gates B1, B2 and B4 remain low, a binary 0, since none of their inputs receive a low from the vertical translator at this time. The inputs of the encoder gates are designated to indicate the output of the vertical translator to which they are connected. By inspection it may be seen that the 0 output of the vertical translator is connected to the "0" inputs of gates B1', B2' and B4' of the binary complementary encoder. The binary 0 signal now on the "0" output of the translator generates a binary 1 on the output of these three gates. Since the "0" output of the translator is not connected to any gates of binary encoder 405, the output of its B1, B2 and B4 gates remain at a binary 0. Thus, it may be seen that the output of the two encoders are complementary when the network receives a marking potential from the M-lead of a single line circuit. The binary 0 signal on the three outputs of binary encoder 405 are extended through the gates 411 which apply a binary 1 or high potential to the inputs of relay A1, A2 and A4. These three relays, therefore remain released at this time. The binary 0's from the three outputs of the encoder 405 are also extended over conductors 412 via gates 416- and 415- to the upper input AND gates 414-1, 414-2 and 414-4. Under the conditions now being described, a binary 0 is applied to the upper input of these three AND gates. The binary 1 on the outputs of the binary complementary encoder are applied over conductors 413- directly to the lower inputs of the three AND gates 414-. At this time, the two inputs to each of these three AND gates are different and thus no AND gate turns ON at this time. The reason for this is that each AND gate 414- currently receives a binary 1 on its lower input from encoder 406 and at the same time, receives a binary 0 on its upper input from encoder 405 via gates 416- and 415-. In summary, with only one input lead to vertical translator 403 energized by a marking potential, the two encoders 405 and 406 produce complementary output potentials so that one input of each of AND gates 414- receives a binary 1 while the other input receives a binary 0. Since the AND condition of the gates 414 occurs only when both inputs receive a binary 1, no AND gate turns on at this time.

The switch translator 404, the encoders 407 and 408, gates 426-, 425- and AND gates 424- operate in a manner analogous to that already described, so that no AND gate 424- turns on as long as only a single marking potential from any of the M-leads is received at the input of the switch translator 404. Specifically, for the call connection now being described, a marking potential is received by gate SO on its input conductor MOO. This generates a binary 0 at the 0 output of the translator i.e., gate 410-0. In response to this signal, the binary complementary encoder 408 applies a binary 1's via conductors 423- to the lower inputs of AND gate 424-; and binary encoder 407 applies binary 0's from its outputs to conductors 422-, via gates 426- and 425-, to the upper input of each of AND gates 424-. Since the upper input of each AND gate 424- is a binary 0 and its lower input is a binary 1, no AND gate turns on.

The output of the binary encoder 407, via gates 421-, controls the operated or nonoperated state of the B1, B2, and B4 relays. For the presently described call, the 0 output of the switch translator 404 is not connected to any of the gate of encoder 407; therefore they remain in an ON condition state with their output at a low or binary 0. This holds the output of gates 421- at a binary 1 or high potential and, in turn, maintains all of the B- relays released.

With all of the A- and B- relays in a released state as a consequence of a marking potential on conductor MOO, it may be seen from an inspection of FIGS. 3 that the left output conductor 303 of the pulser 301 will be connected via the break contacts of the B- and A- relays to the VO vertical control conductor of line switch 0. Also, the right output conductor 304 of the pulser is connected via break contacts of relays E- and D- to the HO control conductor of trunk switch 0.

Rectangle 402 contains circuitry similar to that of rectangle 401. Element 402 receives the mark signals from the M leads of the trunk circuits and, in response thereto, maintains all of its AND gates corresponding to AND gates 414- and 424- in an off state so long as only one marking potential at a time is received.

The output conductors 427-1 and 427-2 of AND gates 414- and 424- extend to input terminals 1 and 2 of OR gate 417. The corresponding output conductors of element 402 are designated 427-3 and 427-4 and they extend to input terminals 3 and 4 of gate 417. All of conductors 427- remain at a binary 1 or high state provided only a single marking potential is received by each of elements 401 and 402. The binary 1 on all of conductors 427- holds the output of gate 417 and input of gate 418 at a binary 0 This maintains the output of gate 418 at a binary "1" which is applied to the upper input of AND gate 420. The other input of gate 420 is connected to common control which applies a binary 1 to gate 420 whenever it is desired to activate the network pulser. The binary 1 on both inputs of gate 420 generates a binary 0 at its output. This is applied to the pulser which, in turn, generates the currents required to close the crosspoints selected by the state of the relay contacts shown on FIGS. 3.

The following describes the operation of the circuit of element 401 when two marking potentials are simultaneously received from the line circuits. Let it be assumed that both line circuits 00 and 77 simultaneously generate marking potentials on conductors MOO and M77. The potential on conductor MOO is applied to gate VO of the vertical translator and to gate SO of the switch translator. The marking potential on conductor M77 is applied to gates V7 and S7. The reception of the marking potential by gate VO causes a binary 0 signal to appear on the 0 output of the vertical translator. This signal is applied to the correspondingly designated inputs of gates B1′, B2′, and B4′ of the binary complementary encoder 406 as already described. The mark signal on conductor M77 is applied to gate V7 and causes a binary 0 to appear on output conductor 7 of the vertical translator. This signal in turn is applied to the correspondingly designated inputs of gates B1, B2, and B4. Thus with reception of these two mark signals simultaneously, all gates of both encoders 405 and 406 are activated, and a binary 1 appears on the output of all gates. The binary 1's from the outputs of the encoder 406 are applied directly to the lower inputs of each of AND gates 414-, the binary 1's from the outputs of encoder 405 are applied via gates 416- and 415- and appear as a binary 1 on the upper inputs of each of AND gates 414-. Thus, under the conditions now described, all AND gates 414- are turned on since a binary 1 is applied to both inputs of each gate. This causes a 0 to be applied to conductor 427-1 which extends to input 1 of OR gate 417. This 0 causes the output of gate 417 to generate a 1, and the output of gate 418 to generate a 0 which is applied to alarm circuit 419 to activate it. Further, the binary 0 from gate 418 is applied to the upper input of AND gate 420 to disable it so that it will not respond to the binary 1 on its lower input when common control attempts to pulse the network.

The simultaneous mark signals on conductors MOO and M77 effect similar circuit actions in the circuitry activated by the switch translator 404. Thus, all of AND gates 424- turn on at this time and apply a binary 0 to the number 2 input of gate 417.

The preceding has described the manner in which the circuit of my invention detects double marking conditions in response to signals from line circuit 00 and 77. In the situation just described, both vertical translator 403 and switch translator 404 generated double outputs. This caused the binary encoder and the binary complementary encoder associated with each translator to generate noncomplementary output information which, in turn, activated the AND gates 414- and 424-.

Other combinations of double marking conditions may occur. Thus, depending upon M conductors on which the double marks appear, the circuitry driven by the vertical translator may cause its encoders to generate valid information while the circuitry associated with the switch translator may cause its encoders to generate invalid or noncomplementary information. Under such conditions, one or more of gates 424- would be turned on while none of gates 414- would be turned on. The converse situation would apply whenever translator 403 is the only one to receive double marks. In short, the pair of encoders that generate the noncomplementary output information depends on the combination of line circuits from which the simultaneous marks are received. Further, the specific AND gate or gates (414-,424-) that are activated in response to the noncomplementary information also depends upon the specific combination of line circuits from which the double marks are received.

In a manner similar to that already described for the line circuits, rectangle 202 detects the application of simultaneous marks from more than one trunk circuit and under such conditions applies a binary 0 to one or both of conductors 427-3 and 427-4 which extend to OR gate 417. The response of this gate and the circuitry controlled by it to the double marked signals from the trunks is identical to that already described for the line circuits.

My invention also permits certain trouble conditions in the network control relays to be detected. In order to describe the manner in which this operation is effected let it once again be assumed that a mark is received from line circuit 00 on its conductor M00. In the manner priorly described, this signal causes a binary 1 to appear on the three outputs of the encoder 406 and a binary 0 to appear on the three outputs of encoder 405. The binary 1's from encoder 406 are applied directly to the lower input of all AND gates 414-. The binary 0's from the outputs of encoder 405 are applied through gates 416- and 415- and appears as a binary 0 on upper inputs of gates 414- so that none of these gates turn on. However, let it be assumed that due to trouble conditions, relay A1 remains operated from a prior usage of the network path establishing circuitry. In this case, a make contact of the relay applies a ground or binary 0 over conductor A1 to the upper input of OR gate 415-1. This 0 turns the gate OFF and causes the output of the gate to apply a binary 1 to the upper input of OR gate 414-1 to turn it ON. Gate 414-1 now turns ON even though the outputs of encoders 405 and 406 are complementary. The turn on of AND 414-1 generates a 0 at its output, and activates OR gate 417 and the circuitry controlled by it including alarm circuit 419 in the manner already described.

Thus, my invention is advantageous in that it permits double marking conditions to be detected as well as faults in the relay control circuitry. In response to such trouble conditions it activates alarm circuit 419 which specifically indicates to a craftsman the nature of the trouble condition. It further disables AND gate 420 so that the system will not respond to the marking signals and pulse the network in an attempt to establish a new network connection.

What is claimed is:

1. In a switching system, an end marked network having a line side and a trunk side, means for establishing a path through said network in response to the application of a single marking potential to each of said sides, means for detecting the concurrent application of a plurality of marking potentials to either of said sides, and means responsive to the detection of said plurality of marking potentials for preventing the operation of said path establishing means.

2. In a switching system, an end marked network having a line side and a trunk side, traffic circuits connected to said network, means in each of said traffic circuits for applying a marking potential to one of said sides to request the establishment of a call connection through said network, means for establishing a connection path through said network between requesting ones of said traffic circuits in response to the application of a single marking potential to each of said sides, means for detecting the concurrent application of a plurality of marking potentials to either of said sides, and means responsive to the detection of said plurality of marking potentials for preventing the operation of said path establishing means.

3. The system of claim 2 in which said means for detecting comprises a line side translator and a trunk side translator, each of said translators being responsive to each marking potential received by its associated side of said network for generating an output signal identifying the traffic circuit applying said marking potential, and means in each of said translators responsive to the concurrent application of a plurality of marking potentials to its associated side for generating multiple output signals identifying the traffic circuits applying said plurality of potentials.

4. The system of claim 3 in which said means for establishing comprises, path determining means, and means responsive to said translator output signals identifying the traffic circuits currently applying said marking potentials for selectively operating said path determining means to determine the network connection path to be established.

5. The system of claim 4 in which said means for preventing comprises means responsive to multiple output signals from either of said translators for generating an inhibit signal to prevent the operation of said path establishing means.

6. In a switching system, an end marked network having a line side and a trunk side, a plurality of appearances on each of said sides, a plurality of line circuits each of which is connected to a different appearance on said line side, a plurality of trunk circuits each of which is connected to a different appearance on said trunk side, means in each of said circuits for applying a marking potential to its network appearance to request a call connection path through said network, means for establishing a connection path through said network between two of said circuits in response to the application of a single marking potential to each of said sides by said two circuits, means for detecting the concurrent application of a plurality of marking potentials to either one of said sides, and means responsive to the detection of said plurality of marking potentials for preventing the operation of said path establishing means.

7. The system of claim 6 in which said means for detecting comprises a line side translator and a trunk side translator, each of said translators being responsive to each marking potential received by its associated side of said network for generating an output signal identifying to the traffic circuit applying said marking potential, each of said translators being further responsive to the concurrent application of a plurality of marking potentials to its associated side for generating multiple output signals identifying the circuits applying said plurality of potentials.

8. The system of claim 7 in which said means for preventing comprises means responsive to multiple output signals from either of said translators for generating an inhibit signal to prevent the operation of said path establishing means.

9. The system of claim 8 in which said means for preventing further comprises, a first encoder responsive to the generation of an output signal by each of said translators for generating an encoded signal identifying each of said circuits currently applying a marking potential to said network, a second encoder responsive to the generation of an output signal by said translators for generating an output signal that is complementary to that of said first encoder, means including each of said encoders responsive to the concurrent application of a plurality of marking potentials to either of said sides for causing said encoders to generate output signals that are noncomplementary with respect to each other, means for comparing the complementary relationship of the outputs of said encoders, means for said establishing network connection if outputs are complementary, and means for preventing said establishment if said outputs are not complementary.

10. The system of claim 9 in which said means for establishing comprises, path determining means, and means responsive to said first encoder output signals identifying the circuits currently applying said marking potentials for selectively operating said path determining means to determine the network connection path to be established.

11. The system of claim 8 in which said means for preventing further comprises, a line side and a trunk side encoder each of which is individual to one of said translators, each of said encoders being responsive to the generation of an output signal by the translator for its side for generating an encoded signal identifying each of said circuits currently applying a marking potential to its side of said network, a line side and a trunk side complement encoder, each of said complement encoders being responsive to the generation of an output signal by the translator for its side for generating an output signal that is complementary to that of the first encoder for the same side, means including both encoders for a side responsive to the concurrent application of a plurality of marking potentials to said side for causing both of said encoders to generate output signals that are not complementary with respect to each other, means for comparing the outputs of both of the said encoders for a side, means for establishing said network connection if said outputs are complementary, and means for preventing said establishment if said outputs are not complementary.

12. The system of claim 11 in which said means for establishing comprises, path determining means, and means responsive to said line side and trunk side encoder output signals identifying the circuits currently applying said marking potentials for selectively operating said path determining means to determine the network connection path to be established.

13. In a switching system, an end marked network having a line side and a trunk side, a plurality of appearances on each of said sides, a plurality of line circuits each of which is connected to a different appearance on said line side, a plurality of trunk circuits each of which is connected to a different appearance on said trunk side, means in each of said circuits for applying a marking potential to its network appearance to request a call connection through said network, line side encoder means and a trunk side encoder means, each of said encoder means being responsive to the application of a marking potential to its associated side of said network for generating a first encoded signal identifying the circuit applying said potential to its side and for concurrently generating a signal that is the complement of said first signal each of said encoder means being responsive to the concurrent application of a plurality of marking potentials to its associated side for generating a first and a second signal that are noncomplementary with respect to each other, means including comparison means responsive to the generation of complementary signals from both of said encoder means for causing the establishment of a network path between the ones of said circuits currently applying said marking potentials, and means including said comparison means responsive to the generation of noncomplementary signals by either of said encoder means for inhibiting the establishment of a network path.

14. The system of claim 13 in which said means for causing the establishment of said path comprises path determining means, and means responsive to said encoder signals identifying the circuits currently applying said marking potentials for selectively operating said path determining means to determine the network connection path to be established.

15. The system of claim 14 in which path determining means comprises a plurality of path determining relays that may be selectively operated by said first encoded signal to determine the network path to be established, a contact on each of said relays for indicating the operated state of its associated relay, and means for interconnecting each of said contacts with said comparison means to provide a signal indicating the failure of said relay to release from a prior path establishing operation, said comparison means being effective to inhibit the establishment of a network path in response to the reception of said failure signal.

16. In a switching system, an end marked network having a line side and a trunk side, traffic circuits connected to said sides of said network, means in each of said traffic circuits for applying a marking potential to one of said sides to request the establishment of a call connection through said network, means responsive to each application of a single marking potential to a side for generating two output signals having a complementary relationship with respect to each other, said last named means being responsive to the concurrent application of a plurality of marking potentials to a side for generating two output signals having a noncomplementary relationship with respect to each other, means for establishing a connection path through said network in response to the generation of complementary output signals, and means for preventing the operating of said path establishing means in response to the generation of said noncomplementary signals.

17. The system of claim 16 in which said means for establishing comprises, path determining means, and means responsive to the first of said two complementary output signals for selectively operating said path determining means to determine the network connection path to be established.

18. The method of operating a system having an end marked switching network comprising the steps of: (1) detecting the presence of each marking potential applied to an appearance on either side of said network, (2) generating a first encoded signal identifying each network appearance receiving a marking potential, (3) generating a signal complementary to said first signal whenever only a single potential is applied to either of said sides, (4) generating a signal that is noncomplementary to said first signal whenever a plurality of marking potentials are concurrently applied to either of said sides, (5) establishing a network path between the currently marked ones of said appearances in response to the generation of said complementary signal, and (6) preventing the establishment of said path in response to the generation of said noncomplementary signal.

19. The method of claim 18 in combination with the further step of: applying said first encoded signal to path determining circuitry to determine the network path that is to be established between the currently marked appearances.

20. In a switching system having an end marked network, first encoding means, second encoding means, said second encoding means being complementary to said first encoding means, means responsive to a network marking potential for applying a signal to said first and said second encoding means, means for comparing the outputs of said first and second encoding means, and means for establishing a path through the network only on detection by said comparing means of complementary outputs from said first and second encoding means.

21. In a switching system, circuitry in accordance with claim 20 wherein said first and second encoding means provide noncomplementary outputs when more than one signal is applied concurrently to said first and second encoding means further comprising, means for preventing the establishing of a path through the network on detection by said comparing means of noncomplementary outputs from said first and second encoding means.

* * * * *

UNITED STATES PATENT OFFICE
CERTIFICATE OF CORRECTION

Patent No. 3,692,943 Dated September 19, 1972

Inventor(s) Louis Emanuel Thelemaque

It is certified that error appears in the above-identified patent and that said Letters Patent are hereby corrected as shown below:

Column 2, line 56, after "turn" change "of", first occurrence, to --on--.

Column 4, line 66, after "crosspoints" change "all" to --that--.

Column 6, line 5, change "4C" to --4D--.

Column 8, line 27, change "gate" to --gates--.

Column 12, line 1, delete "to" and "traffic".

Signed and sealed this 6th day of March 1973.

(SEAL)
Attest:

EDWARD M.FLETCHER,JR.
Attesting Officer

ROBERT GOTTSCHALK
Commissioner of Patents